(12) United States Patent
Seastrom et al.

(10) Patent No.: US 10,928,218 B2
(45) Date of Patent: Feb. 23, 2021

(54) MAP INFORMATION MANAGEMENT AND CORRECTION OF GEODATA

(71) Applicant: CHARTER COMMUNICATIONS OPERATING, LLC, Saint Louis, MO (US)

(72) Inventors: Robert Seastrom, Leesburg, VA (US); Wesley E. George, IV, Manassas, VA (US); Chris R. Roosenraad, Vienna, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 199 days.

(21) Appl. No.: 16/134,011

(22) Filed: Sep. 18, 2018

(65) Prior Publication Data
US 2019/0017841 A1    Jan. 17, 2019

Related U.S. Application Data

(63) Continuation of application No. 14/286,504, filed on May 23, 2014, now Pat. No. 10,107,642.

(51) Int. Cl.
*G01C 21/36*    (2006.01)

(52) U.S. Cl.
CPC .................. *G01C 21/3679* (2013.01)

(58) Field of Classification Search
CPC ...................................... G01C 21/3679
See application file for complete search history.

(56) References Cited

U.S. PATENT DOCUMENTS

2013/0326380 A1    12/2013    Wei et al.
2013/0337830 A1    12/2013    Haro et al.

*Primary Examiner* — Michael D Lang
(74) *Attorney, Agent, or Firm* — Armis IP Law, LLC

(57) ABSTRACT

A mobile communication device initiates display of a point of interest as being located at particular coordinates on a map. In response to receiving an input command from a user of the mobile communication device indicating that the particular location of the point of interest as specified by the map is incorrect, the mobile communication device forwards a communication (specifying a location of the mobile communication device and an identity of the point of interest) over a network to a map management resource. Based on feedback from the mobile communication device, the map management resource updates map data an actual location of the point of interest as opposed to an incorrect location as specified by the particular coordinates on the map. Subsequent distribution of the updated map information from the map management resource specifies the proper coordinates of the point of interest in the geographical region.

34 Claims, 11 Drawing Sheets

MAP INFORMATION MANAGEMENT AND CORRECTION OF GEODATA

RELATED APPLICATION

This application is a continuation application of U.S. patent application Ser. No. 14/286,504 entitled "MAP INFORMATION MANAGEMENT AND CORRECTION OF GEODATA," filed on May 23, 2014, the entire teachings of which are incorporated herein by this reference.

BACKGROUND

Geodata stored in Geographic Information Systems (GIS) is becoming of increasing importance to many industries. In well-known consumer applications (such as Google™ and Bing™ maps), geodata specifies a respective location of a resource on a map. The geodata is typically useful for notifying persons where a resource (such as gas stations, restaurants, street number information, etc.) is located in a geographical region when creating a respective map. Local governments and public utilities now make extensive use of GIS systems to keep track of location information for different types of resources such as property lines, manhole covers, roads, businesses, etc.

GIS databases are typically searchable to find information of interest. In many instances, the GIS databases are populated with a certain amount of location information that is, to some degree or another, incorrect. As an example, geodata in a GIS database may indicate that a location of a restaurant is one location, where in reality, the restaurant is actually located at another location. Inaccurate geodata is undesirable for obvious reasons.

One possible reason for geodata inaccuracy is that GPS (Global Positioning System) data collected before the month of May in the year 2000 could be off by several tens of meters due to "selective availability", that is, deliberate degradation of the civilian (L1) signal at the request of the U.S. DoD (Department of Defense).

Satellite positioning receivers have improved drastically over the years in terms of accuracy, particularly with the advent of WAAS (Wide Area Augmentation System) and hybrid receivers (for example the iPhone 4S) that simultaneously take advantage of the United States' GPS and Russia's GLONASS (GLObal NAvigation Satellite System). Another example of a position detection system is Galileo built by the European Union. "Newer" positional fixes with more modern equipment are, thus, likely to be more exact than older positional fixes.

Note that other conventional methods of position detection can include mobile network location triangulation, and/or WiFi™ access point location data, etc. Many conventional phones rely heavily on the latter both to improve speed of location resolution and to compensate for line of sight issues preventing a good GPS lock.

Currently, if a user of retrieved map information determines that a respective "marker" denoting the exact location of a given item in the geodata is not accurately placed on a displayed map, one way to correct such data is to manually identify the problem. For example, some web UIs (User Interfaces) provide a user the ability to input a text string such as "this symbol is incorrectly located" and drag the marker (representing a location of a respective landmark) to the more accurate latitude and longitude location on the map. Via the text string, the user can specify exactly the issue associated with the corresponding geodata. Typically, these text updates from users must be processed manually (reviewed by a human) because the corresponding data is not easily understood by a machine.

BRIEF DESCRIPTION OF EMBODIMENTS

Embodiments herein provide more advanced methods of collecting feedback to correct geodata in comparison to conventional techniques.

More specifically, in one embodiment, a user operates a mobile communication device to communicate with a map management resource to obtain a map including a point of interest. The point of interest on the map can represent a resource such as a landmark. In response to receiving a request for the map, the map management resource initiates distribution of map information over a network to the mobile communication device operated by the user.

Assume in this example embodiment that the received map information indicates that the point of interest is located at particular coordinates on a map of a respective geographical region. The mobile communication device utilizes the map information to display a rendition of a map and rendition of the corresponding point of interest on a respective display screen. In accordance with received map information, the map rendered on the display screen indicates that the point of interest is located at the particular coordinates. Assume that the user of the mobile communication device identifies that the particular coordinate of the point of interest as specified by the rendered map is incorrect. In other words, the actual location of a landmark represented by the point of interest may be a substantially different location than the particular coordinates as specified on the map.

To provide feedback indicating that the point of interest is not located at the particular coordinates on the map, the user of the mobile communication device inputs a command to the mobile communication device. The command inputted to the mobile communication device causes the mobile communication device to provide notification over a network to a map management resource that the actual location of the point of interest is different than as specified by the particular coordinates on the rendered map.

By way of further non-limiting example embodiment, note that the mobile communication device can be configured to receive location information specifying a current location (such as an actual physical location) of the mobile communication device in the geographical region. In response to receiving the input command from the mobile device user (to update inaccurate geodata as discussed above), the mobile communication device forwards information such as a communication including the location information and an identity of the point of interest over a network to the map management resource to update the map information.

The communication generated and forwarded by the mobile communication device to update geodata can further include information such as new coordinates specifying a proposed location on a map where the point of interest is located. In other words, the user can specify a coordinate on the map where a symbol representing the respective landmark should be located to indicate where the point of interest is located in a respective geographical region.

The user of the mobile communication device can specify the actual location of the point of interest in any suitable manner. For example, in one embodiment, the mobile device user can provide input to the mobile communication device indicating that the user (and/or corresponding mobile communication device) currently resides at the actual location of the point of interest. In such an instance, the communication from the mobile communication device to the map management resource indicates that the current location of the mobile communication device is the actual location of the point of interest as opposed to the particular coordinate as specified by the map.

Alternatively, the mobile device user may be situated near but not actually at the point of interest. In such an instance, the mobile device user can provide input such as selection of new coordinates (proposed coordinates) on the map (as displayed on the display screen of the mobile communication device) to indicate the actual location where the point of interest is located in the geographical region. In such an instance, the mobile communication device receives user selection of the new coordinates displayed on the map. The map management resource receives the set of coordinates (proposed location where the point of interest is located) based on the user of the communication device selecting the set of coordinates on the map and forwarding them to the map management resource.

In accordance with yet further embodiments, the map management resource receives the communication from the mobile communication device indicating that the point of interest is located at the proposed location (such as at a location specified by the new coordinates) rather than the original location as specified by the particular coordinates.

In one embodiment, prior to updating a location of a point of interest, the map management resource compares a closeness of the proximity of the mobile communication device (as specified by received location information) to the proposed coordinates (e.g., location where the mobile device user indicates the point of interest is actually located) to determine a degree of reliability associated with the proposed new coordinates. The nearer the mobile communication device is to the particular coordinates (original incorrect coordinates) and/or the newly proposed coordinates, the more likely it is that the feedback indicating the location of the actual location of the point of interest is correct.

In accordance with further embodiments, in accordance with the communication received from the mobile device user, the map management resource updates corresponding map data to specify that an actual location of the point of interest is specified by the new proposed coordinates as specified by the mobile device user instead of the original incorrect coordinates.

Updating of geodata can be dependent upon one or more factors. For example, prior to updating map information correcting a respective location of the point of interest, the map management resource can be configured to assess the credibility of the mobile device user submitting a correction to geodata to determine whether the user is credible. More specifically, in one embodiment, the map management resource processes the communication (to update geodata) to identify an identity of the user transmitting the communication from the mobile communication device. The map management resource maps the identity of the user to a corresponding reputation metric assigned to the user. In response to receiving the communication from the mobile device user and detecting that the corresponding reputation metric is above a threshold value (indicating that input from the mobile device user is sufficiently credible), the map management resource updates the map data for the point of interest to specify that an actual location of the point of interest is the mobile device user's proposed coordinates instead of the original coordinates.

In certain instances, in addition to tying feedback to reputation data, it may be required that multiple users above a threshold value indicate to correct geodata in a particular manner before the geodata is changed. As described herein, responses from more active and "trustworthy" users can be considered more important and useful than from others.

As further described herein, embodiments herein build on the concept of "hard to gain positive reputation, easy to lose it" where a user's reputation is tracked over time, and goes up or down based on their behavior.

In one embodiment, the map management resource produces a corresponding reputation metric for a user based on one or more prior instances of the mobile device user providing proper coordinate corrections for other points of interest in the past.

In accordance with further embodiments, the map management resource may initiate updating coordinate information associated with the point of interest only if a sufficient number of mobile communication device users above a threshold value indicate that the point of interest is actually located at a different location than as specified by original coordinates. Thus, a single errant feedback from a given user may not necessarily cause the point of interest to be specified by incorrect coordinates.

In accordance with yet further embodiments, the mobile communication device (or other suitable resource) can be configured to provide the accuracy of location information provided by the corresponding reporting device (mobile communication device). As an example, in one embodiment, the mobile communication device produces metadata indicating a level of position accuracy associated with the generated location information (associated with the mobile communication device reporting a geodata error). The mobile communication device also forwards the metadata associated with the location information to the map management resource. The map management resource uses the metadata to determine a respective accuracy of reported location information and whether or not to update the coordinates of a respective symbol representing a point of interest. In one embodiment, if the location information is sufficiently accurate, the map management resource updates the coordinates of the point of interest to a corrected location.

Any suitable information can be used to produce metadata specifying an accuracy of the location information. For example, in one non-limiting example embodiment, a location detection resource in the mobile communication device generates the metadata to specify a number of GPS/GLONASS satellites that were used to produce the location information of the mobile communication device. In accordance with further embodiments, the location detection resource can be configured to produce the metadata to indicate the type of location system that was used to generate the location information specifying a location of the mobile communication device, whether the distance between the current and reported location of the mobile communication device is or is not within the margin of error for the generation of GPS receiver reporting, whether location information is supplemented by mobile network tower triangulation or WiFi network location info, etc.

Subsequent to updating the coordinate information associated with the point of interest, the map management resource and/or mobile communication device can be configured to update a corresponding map displayed on the display screen of the mobile communication device to indicate that the point of interest is located in a location as specified by the updated coordinates as opposed to the original incorrect coordinates in the geographical region.

In addition to the embodiments above, note further that embodiments as described herein include presenting a respective mobile device user with a selectable display element that enables the mobile device user to easily provide feedback that a point of interest no longer exists such as because a respective establishment is out of business. As implemented in conventional consumer applications such as Waze™ and Google™ maps, corrections largely take the form of written language email. For example, to provide feedback that a map includes a point of interest that no longer exists, a user may create an e-mail including the following text: "This convenience store is closed; it has been replaced by Jim's Car Repair Shop." According to conventional techniques, this information is then manually post-processed and integrated into a respective database.

In contrast to conventional techniques, embodiments herein provide a simple way for a respective mobile device user to provide feedback regarding a location of a point of interest. For example, as discussed herein, when activated, a user interface of a portable device communicates a current position (such as current physical location) of the portable device (mobile communication device) along with metadata about a point of interest (such as a resource currently being searched or tracked). In addition to including location information specifying the location of the portable device, the communication can further indicate that the mobile device user has found a point of interest and that the user is currently located at the point of interest. Such information may be communicated in real time or at a later date, to centralized or distributed servers, which may elect to update their GIS data based on a "trustworthiness vector sum" of one or more individual anomaly reporters, or other business process criteria. As previously discussed, the trustworthiness (reputation metric) assigned to each of the users may vary. For example, in one embodiment, a cable television company may only need input from one field technician to update position data for a respective resource. A customer review web site such as Yelp™ may require input from a multiple (such as a dozen or more) ordinary end users before updating respective geodata to indicate a correct location of a mutual point of interest.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage medium, system, hardware, etc., having instructions stored thereon. The instructions, when executed by computer processor hardware, cause the computer processor hardware of the system to: initiate display of a point of interest as being located at particular coordinates on a map, the map displayed on a display screen of a mobile communication device; receive location information specifying a current location of the mobile communication device in a geographical region; and in response to an input command from a user of the mobile communication device, forward the location information and an identity of the point of interest over a network to a map management resource to update map data specifying an actual location of the point of interest.

Another embodiment as described herein includes computer readable storage medium, system, hardware, etc., having instructions stored thereon. The instructions, when executed by computer processor hardware, cause the computer processor hardware of the system to: initiate distribution of map information over a network to a mobile communication device operated by a user in a network environment, the map information indicating a point of interest as being located at a first location in a respective geographical region as specified by the map information; receive a communication from the mobile communication device, the communication including location information indicating a current location of the mobile communication device and an identity of the point of interest, the communication further indicating that the point of interest is located at a second location in the geographical region; and in accordance with the communication, update map data to specify that an actual location of the point of interest is the second location instead of the first location.

Another embodiment as described herein includes computer readable storage medium, system, hardware, etc., having instructions stored thereon. The instructions, when executed by computer processor hardware, cause the computer processor hardware of the system to: initiate display of a point of interest as being located at particular coordinates on a map, the map displayed on a display screen of a mobile communication device; receive selection of a symbol representing the point of interest; initiate display of multiple options on the display screen, the multiple options specifying different types of possible errors that can be associated with the symbol; and receive input from the user selecting one of the multiple options, the selected option specifying an attribute of the symbol that is incorrect.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing a way to provide feedback to a map management resource to correct geodata. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
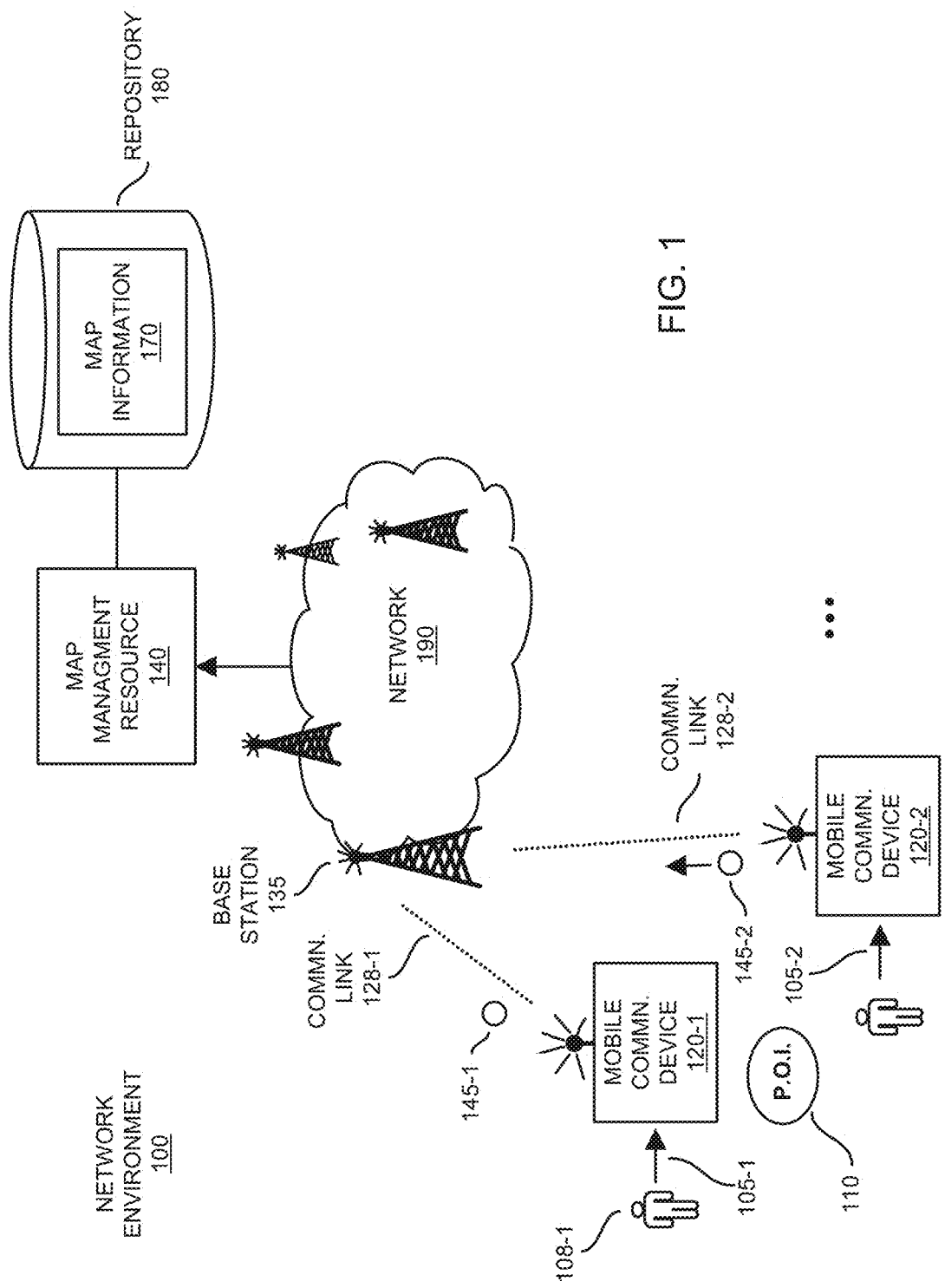
FIG. 1 is an example diagram illustrating a network environment and management of geographical information (such as geodata) according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In general, a mobile communication device initiates display of a point of interest as being located at particular coordinates on a map. In response to receiving an input command from a user of the mobile communication device indicating that the particular coordinates of the point of interest (such as a landmark) as specified by the map are incorrect, the mobile communication device forwards a communication over a network to a map management resource. In one embodiment, the communication specifies an actual physical location of the mobile communication device and an identity of the point of interest. Based on feedback from a user of the mobile communication device, the map management resource updates map data to indicate that the point of interest is located at coordinates as specified by the operator of the mobile communication device instead of the original incorrect coordinates. Subsequent distribution of the updated map information from the map management resource specifies the proper coordinates of the point of interest as opposed to the incorrect coordinates. In certain instances, feedback from multiple mobile device users (as opposed to only a single user) may be necessary to update geographical information (geodata).

Now, more specifically, FIG. 1 is an example diagram illustrating a network environment according to embodiments herein.

As shown, network environment 100 includes multiple mobile communication devices 120 (e.g., mobile communication device 120-1, mobile communication device 120-2, etc.). A respective user operates each of the multiple communication devices 120. For example, user 108-1 operates mobile communication device 120-1; user 108-2 operates mobile communication device 120-2; and so on. Network environment 100 can include any number of mobile communication devices 120.

Each of the mobile communication devices 120 can be any suitable type of computer device. For example, a respective mobile communication device in network environment 100 can be a cell phone, mobile computer, mobile phone device, digital assistant, a laptop computer, a personal computer, a notebook computer, a netbook computer, a handheld computer, a workstation, etc.

Network 190 can be or include any suitable type of wired or wireless network resources facilitating communications with map management resource 140. In one embodiment, a respective mobile communication device 120 is a client device; map management resource 140 is a server resource. By way of non-limiting example embodiment, the mobile communication device 120-1 and map management resource 140 communicate in accordance with any suitable client-server communication protocols. In one embodiment, network 190 includes a packet-switched network over which the map management resource 140 and the mobile communication devices 120 communicate with each other.

Map management resource 140 can be a server resource configured to selectively and automatically update inaccurate geodata based on feedback from one or more mobile communication devices in network environment 100.

Wireless communication links 128 can support communications in accordance with any suitable wireless communication protocol such as WiFi™, cellular phone protocols such as those based on CDMA (Code Division Multiple Access), GSM (Global System for Mobile Communications), IP (Internet Protocol), etc.

In this example embodiment, via input 105-1, user 108-1 controls respective one or more applications executing on mobile communication device 120-1; via input 105-2, user 108-2 controls respective one or more applications executing on mobile communication device 120-2; and so on.

In accordance with yet further embodiments, the users 108 operate respective mobile communication devices 120 to provide feedback with respect to the accuracy of map information 170 stored in repository 180. For example, in one non-limiting example embodiment, the mobile communication device 120-1 communicates (via communications 145-1) over wireless communication link 128-1 and through base station 135 to retrieve map information 170 stored in repository 180. The map information 170 includes geographical information specifying coordinates of one or more points of interest in a geographical region in which the mobile communication device 120-1 and corresponding user 108-1 reside. Assuming map information 170 is accurate, display of map information 170 as a map on a display screen of mobile communication device 120-1 enables the user 108-1 to find one or more points of interest.

Assume further in this example embodiment that the user 108-1 of mobile communication device 120-1 learns that a map displayed on the mobile communication device 120-1 incorrectly displays coordinates of a point of interest 110 (such as a landmark). In response to detecting this condition (inaccurate geodata), the user 108-1 generates input 105-1 (such as a command) to mobile communication device 120-1 indicating that the coordinates of respective point of interest 110 on the retrieved map are incorrect. In response to receiving the input 105-1, the mobile communication device 120-1 transmits a feedback communication 145-1 to map management resource 140.

In one embodiment, feedback communication 105-1 includes suitable information to correct geographical coordinates associated with point of interest 110 as specified by map information 170. In one embodiment, among other data, the feedback communication 145-1 transmitted from the mobile communication device 120-1 to management resource 140 includes information specifying an actual location (at least from the perspective of the user 108-1) or coordinates associated with the point of interest 110.

Note that in a similar manner that user 108-1 operates mobile computer device 120-1 to generate feedback via communications 145-1 as discussed above, user 108-2 can operate mobile computer device 120-2 to generate feedback via communications 145-2 over wireless communication link 128-2 to indicate that a retrieved map incorrectly states coordinates of one or more corresponding points of interest. Thus, each of one or more different mobile device users in network environment 100 can provide feedback regarding inaccurate geodata.

In one embodiment, as further discussed below, in response to receiving feedback indicating that the mapping information 170 incorrectly specifies coordinates of one or more points of interest, the map management resource 140 selectively updates map information 170 stored in repository 108. In one non-limiting example embodiment, as further discussed below, a prerequisite to updating the map information 170 may be that the user providing the feedback is verified as being trustworthy. Thus, based on feedback from one or more users in network environment 100, map management resource 140 makes corrections to stored map information 170.

Figure 2:
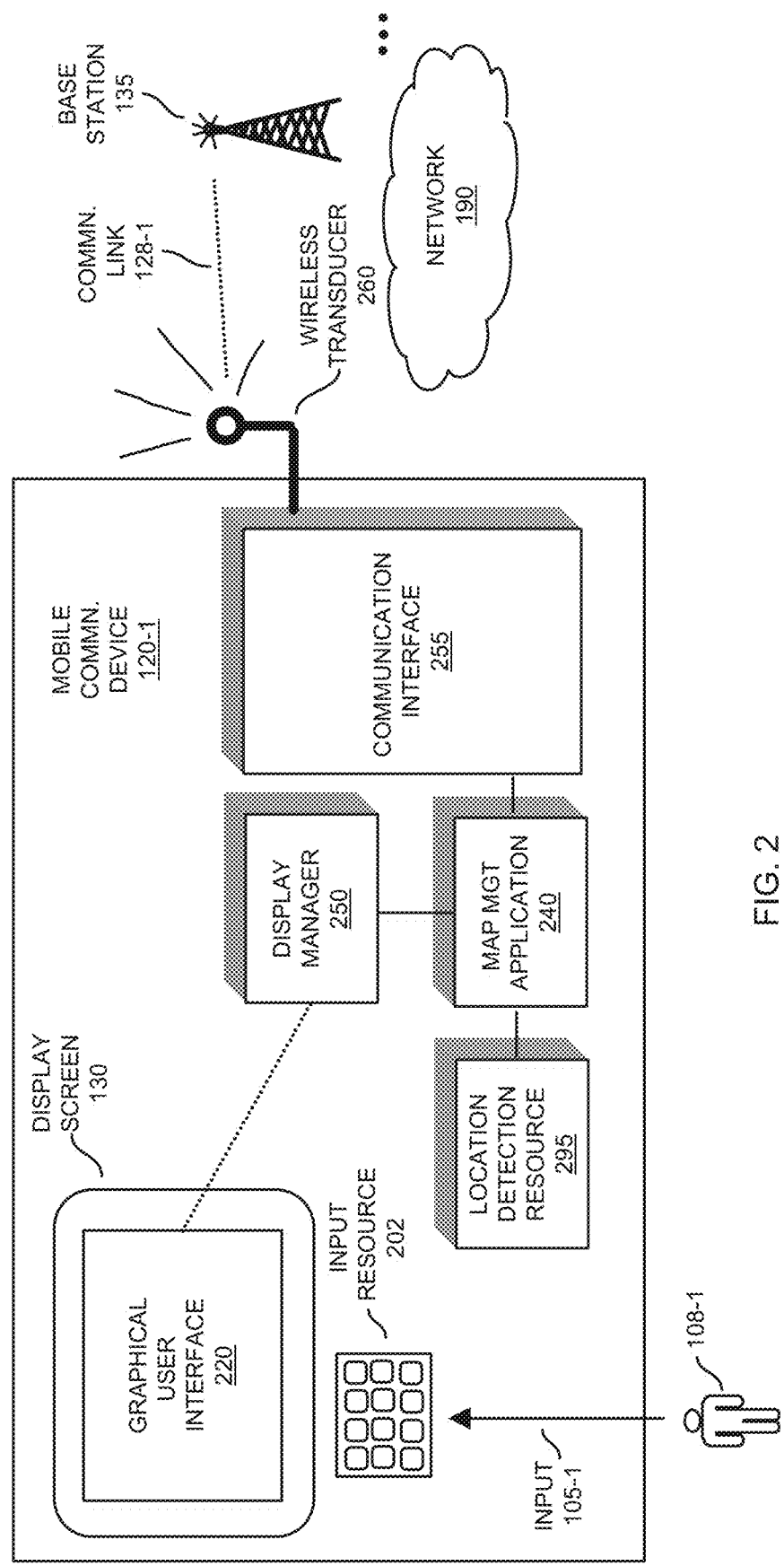
FIG. 2 is an example diagram illustrating a mobile communication device and corresponding components according to embodiments herein.

FIG. 2 is an example block diagram illustrating functionality associated with a respective mobile computer device according to embodiments herein. Note that mobile computer device 120-1 can include any suitable hardware and software resources to carry out operations as discussed herein.

More specifically, as shown in this example embodiment, mobile communication device 120-1 includes map management application 240, display manager 250, location detection resource 295, and communication interface 255.

Assume that the user 108-1 initiates execution of map management application 240. As shown, via display manager 250, the management application 240 initiates display of corresponding graphical user interface 220 on display screen 130 of mobile communication device 120-1. Graphical user interface 220 enables the respective user 108-1 to view retrieved information such as retrieved map information 170.

Assume in this example embodiment that the user 108-1 submits input 105-1 (e.g., commands, clicks, button presses, etc.) through input resource 202 to map management application 240 to retrieve map information 170 as previously discussed In accordance with the received input 105-1, the map management application 240 initiates communications with the map management resource 140 via communications through communication interface 255 over network 190. Communication interface 255 transmits a respective wireless communication from wireless transducer 260 over wireless communication link 128-1 of network 190 to map management resource 140. In a reverse direction, the map management resource 140 conveys requested map information 170 over wireless communication link 128-1 to mobile communication device 120-1.

Via communications over communication link 128-1, nMap management application 240 receives map information 170 and initiates display of corresponding map information 170 in graphical user interface 220 on display screen 130 for viewing by the user 108-1.

The map management application 240 of mobile communication device 120-1 can receive location information specifying a current location of the mobile communication device 120-1 in any suitable manner. In one embodiment, as shown, the mobile communication device 120-1 can include location detection resource 295 such as a GPS (Global Positioning System) to determine a current location of the mobile communication device 120-1 in a geographical region. Specific use of the location information is discussed in more detail below.

Note that any suitable technique can be used to determine a location of a respective mobile communication device. For example, embodiments herein contemplate use of satellite navigation systems such as GPS (used in the U.S.), Galileo (used in Europe), GLONASS (used in Russia), IRNSS (used in India), Compass (used in China), or the like. Further embodiments herein can include use of terrestrial-based location services such as LORAN, cell tower triangulation, inertial navigation services, WLAN-SSID-based approaches, etc. Thus, location detection resource 295 can rely on use of any location service to produce location information for use by map management application 240.

Figure 3:
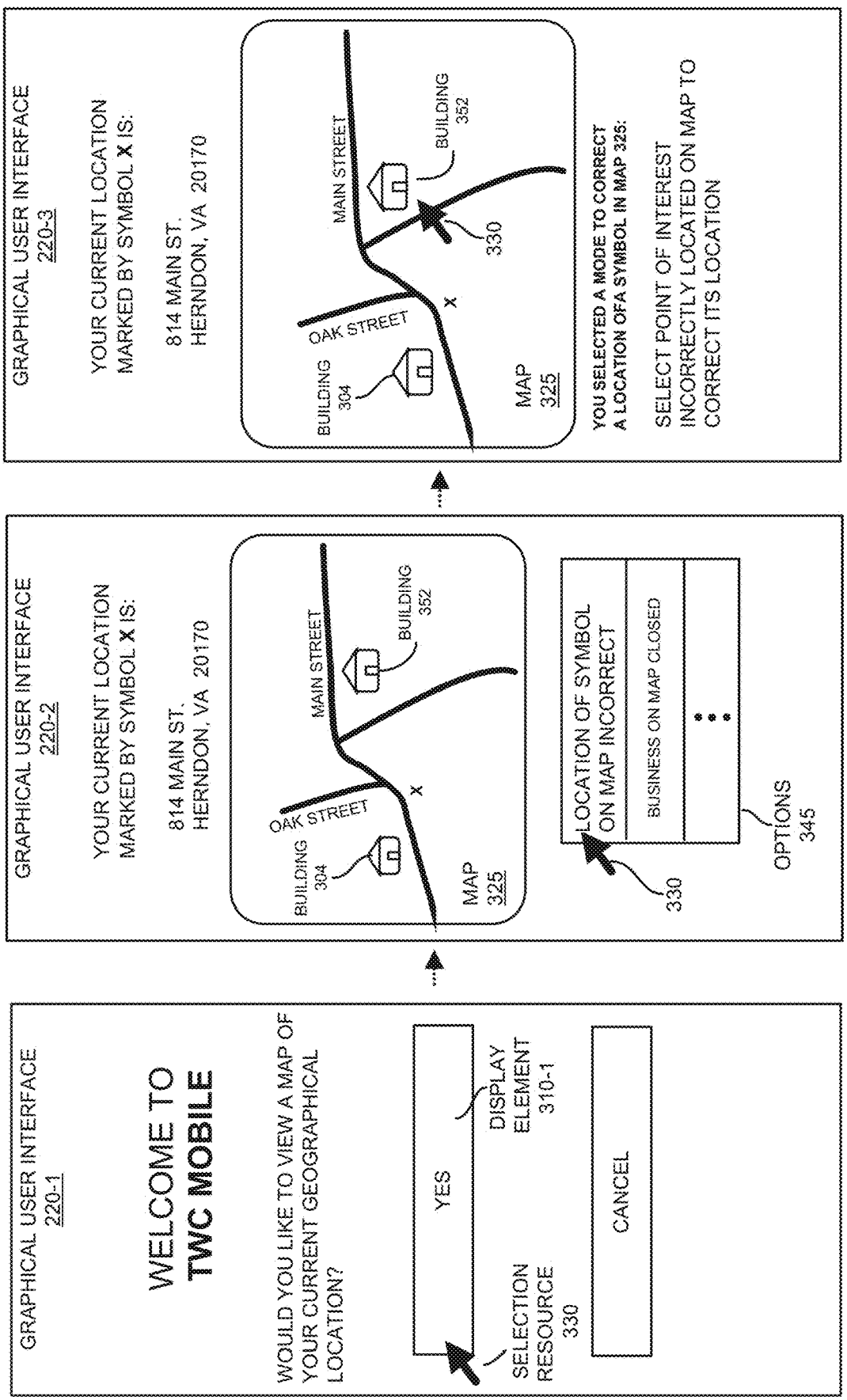
FIG. 3 is an example diagram illustrating a graphical user interface facilitating selection of an incorrectly located point of interest on a amp according to embodiments herein.

FIG. 3 is an example diagram illustrating a graphical user interface facilitating correction of map information according to embodiments herein.

In this example embodiment, map management application 240 initiates display of graphical user interface 220-1 on display screen 130 of mobile communication device 120-1. Via the graphical user interface 220-1 as shown, the map management application 240 enables the respective user 108-1 to view a map of a current location in which the user 108-1 resides. Graphical user interface 220-1 displays the query "Would you like to view a map of your current geographical location?" In response to selection of display element 310-1 (YES), the map management application 240 initiates communications with map management resource 140 to retrieve map information 170. Using retrieved map information 170, the map management application 240 initiates display of respective map 325 in graphical user interface 220-2. Thus, as shown, the user 108-1 operates mobile communication device 120-1 to communicate with a map management resource 140 (at a respective remote location) to obtain and display map 325 including one or more points of interest (such as building 304, building 352, roads, etc.).

Each of the points of interest can represent any suitable type of resource such as a landmark, an item, an object, etc.

In a manner as previously discussed, in response to receiving a respective request for map information 170 from user 108-1, the map management resource 140 initiates distribution of map information 170 over a network 190 to the mobile communication device 120-1. As shown, assume further in this example embodiment that the map information 170 used to generate map 325 indicates that: i) building symbol 304 (a first point of interest) representing a first building (such as physical building 304) is located at a first location on map 325, building symbol 352 representing a second building (such as physical building 352) is located at a second location on map 325, etc.

The map management application 240 of mobile communication device 120-1 utilizes the retrieved map information 170 to display a rendition of map 325 and corresponding rendition of the different points of interest (such as building symbol 304, building symbol 352, Oak Street, Main Street, etc.) on graphical user interface 220-2.

In addition to displaying symbols of points of interest on map 325, one embodiment herein includes displaying a marking (such as the letter 'X') to indicate a current location of the user 108-1 in a geographical region. Recall that mobile communication device 120-1 can be configured to include location detection resource 295. In one embodiment, the location detection resource 295 tracks a current location of mobile communication device 120-1 and notifies map management application 240 of the detected current location of the mobile communication device 120-1. The map management application 240 uses the location information to place the letter 'X' at the appropriate location on map 325 where the user 108-1 and mobile communication device 120-1 are located.

As shown in graphical user interface 220-2, user can select from options 345 (such as selectable display elements in a pull-down menu) to update a symbol on map 325. Yet further in this example embodiment, assume that the user of the mobile communication device 120-1 detects that the actual location of the first building (point of interest) as specified by building symbol 352 on the rendered map 325 is incorrect. In other words, assume that the actual location of physical building 352 is located at a substantially different location than at the coordinates of the building symbol 304 on the map 325. In such an instance, the user 108-1 uses selection resource 330 to select the option indicating that the location of a symbol on the multiple access point is incorrect. In response to this selection, the map management application 240 initiates display of graphical user interface 220-3 on a respective display screen of the mobile communication device 120-1.

Graphical user interface 220-3 enables a respective user 108-1 to provide feedback to correct errors associated with map 325 and corresponding map information 170. For example, in one embodiment, to provide feedback indicating that the physical building 352 (point of interest) is not located at the coordinates as specified by the building symbol 352 on the map 325, the user 108-1 of the mobile communication device 120-1 inputs a command to the mobile communication device 120-1.

Assume further in this example embodiment that the user 108-1 uses selection resource 330 to indicate that the building symbol 352 is incorrectly located on map 325. The inputted command (such as use of selection resource 330 to select building symbol 352 on map 325) provides notification to the map management application 240 that the user 108-1 believes that the actual location of the physical building 352 (as perceived in person) is different than coordinates as specified by the original placement of building symbol 352 on the rendered map 325.

Figure 4:
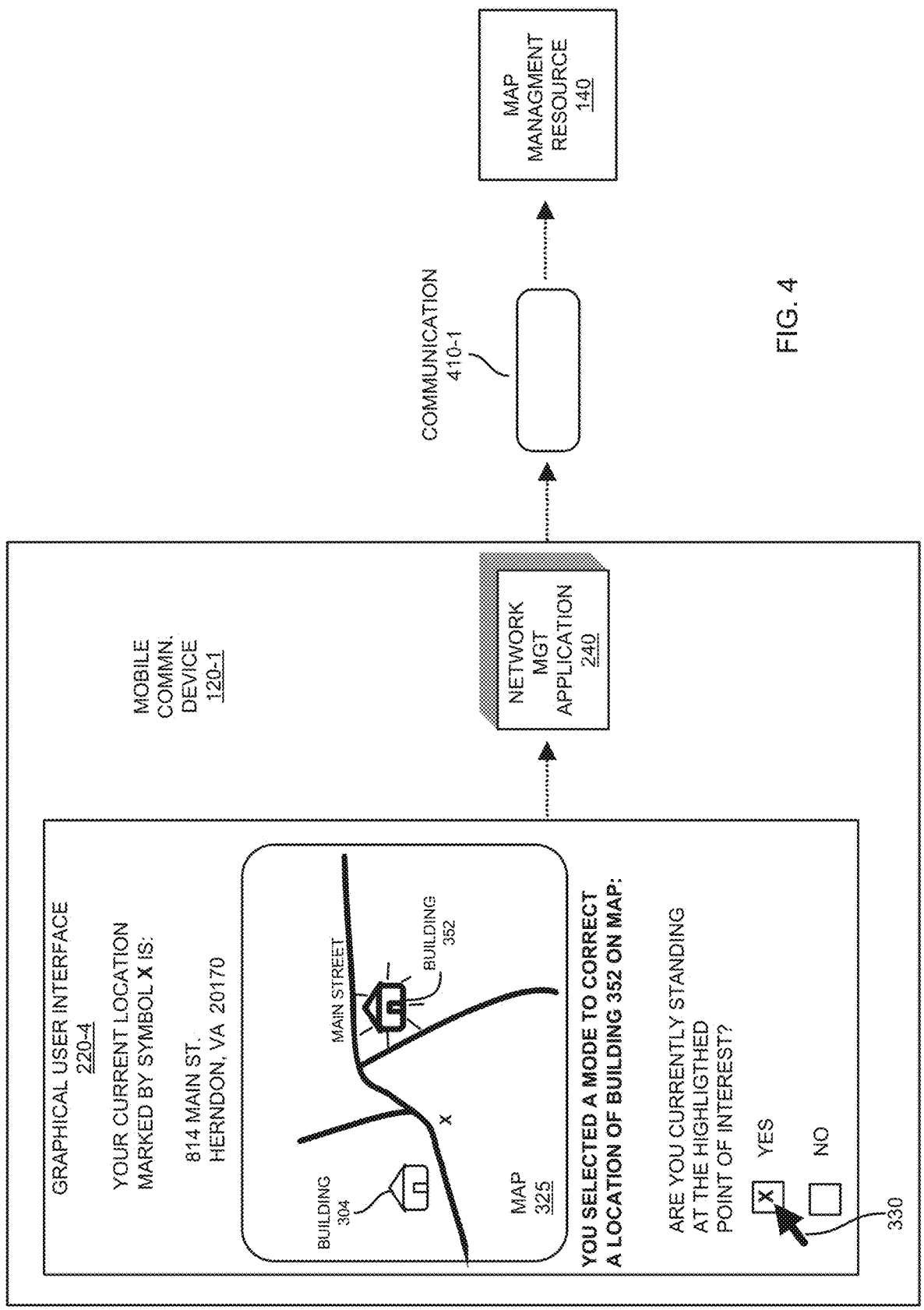
FIG. 4 is an example diagram illustrating generation and forwarding of a communication from a mobile communication device to update geographical information (such as geodata) according to embodiments herein.

FIG. 4 is an example diagram illustrating generation and forwarding of a communication from a mobile communication device to update geographical information according to embodiments herein.

As shown, in response to selection of the building symbol 352 via selection resource 330 in FIG. 3, the map management application 240 provides a visual indication (such as highlights, bolding, shading, flashing, etc.) in map 325 of graphical user interface 220-4 of FIG. 4 to indicate that the user 108-1 selected building symbol 352.

Note that the user 108-1 of the mobile communication device 120-1 may or may not be located at a current location of physical building 352. In one embodiment, to determine whether or not the user 108-1 is currently located at physical building 352, the map management application 240 initiates display of an inquiry in graphical user interface 220-4 such as the question "Are you currently standing at the selected point of interest?" Via yes and no checkboxes, the user 108-1 can easily provide input whether they currently are located at the selected point of interest (building 352 in this example embodiment).

Assume further in this example embodiment that the user selects "YES" as an answer indicating that the physical building 352 is located at the coordinates marked X (the user's current location) on the map 325 as opposed to the building being located at the coordinates as specified by building symbol 352 on map 325.

In response to receiving the input command such as selection of the YES box in graphical user interface 220-3, the map management application 240 of mobile communication device 120-1 generates a communication 410-1 to include data such as an identity of the selected point of interest (building 352) and a current location of the mobile communication device in a respective geographical region.

The map management application 240 initiates transmission of the generated communication 410-1 over wireless communication link 128-1 of network 190 to the map management resource 140 to update the stored map information 170.

In one embodiment, the communication 410-1 (a message) is specifically encoded to indicate that the user 108-1 selected the YES box, notifying the map management resource 140 that the user 108-1 purports that the actual location of the physical building 352 is at the location X (user's current location) as opposed to being located at the original coordinates as specified by map 325. In accordance with further embodiments, the communication of 410-1 can include an identity of the user 108-1.

Via received communication 410-1, the map management resource 140 is able to identify that the user 108-1 believes that the physical building 352 is located at different coordinates than as initially specified by map information 170. In one embodiment, if the map management resource deems the user 108-1 to be sufficiently trustworthy, the map management resource 140 updates map information 170 to correct geodata (map coordinates for building symbol 352) specifying a corresponding actual physical location of building 352.

Accordingly, in one embodiment, the map management application 240 initiates display of a selectable symbol (such as selectable YES check box in graphical user interface 220-4) on the display screen 130 of mobile communication device 120-1. The map management application 240 receives the input command to update geodata (associated with building 352) in response to the user of the communication device 120-1 selecting the selectable symbol (YES checkbox) to update the map data.

In accordance with yet further embodiments, the location detection resource 295 of mobile communication device 120-1 can be configured to provide the accuracy of corresponding generated location information to map management resource 140. As an example, in one embodiment, the location detection resource 295 produces accuracy metadata indicating a degree of position accuracy associated with the generated location information. In addition to forwarding the location information (as generated by the location detection resource 295), the mobile communication device 120-1 also forwards the metadata associated with the location information to the map management resource 140. The map management resource 140 uses the generated metadata to determine a respective accuracy of reported location information and whether or not to update the coordinates of a respective symbol representing a point of interest.

In one embodiment, if the location information is sufficiently accurate such as above a threshold value, the map management resource updates the coordinates of the point of interest. More specifically, the mobile communication device 120-1 can notify the map management resource 140 that the location information produced by the location detection resource 295 is within several feet. Assuming that the map 325 indicates that the physical location corresponding to coordinates of building symbol 352 on map 325 is a couple hundred feet away from the current location of user 108-1 as marked by coordinates of the letter X, the map management resource 140 updates the location of the building symbol 352 to be the current location of the user 108-1. Conversely, if the degree of position accuracy associated with generated location information is poor, the map management resource 140 does not use the feedback from the user 180-1 to update the coordinates of the point of interest.

Note again that any suitable information can be used to produce metadata specifying an accuracy of the location information. For example, in one non-limiting example embodiment, the location detection resource 295 in the mobile communication device 120-1 generates the metadata to specify a number of GPS/GLONAS satellites that were used to produce the location information of the mobile communication device 120-1. The greater the number of satellites used to produce the location information, the higher the accuracy of the location information.

In accordance with further embodiments, the location detection resource can be configured to produce the accuracy metadata (as forwarded to the map management resource 140) to indicate the type of location monitoring system that was used to generate the location information specifying a location of the mobile communication device 120-1, whether the distance between the current and reported location of the mobile communication device 120-1 is or is not within the margin of error for the generation of GPS receiver reporting, whether the generated location information is supplemented by mobile network tower triangulation or WiFi™ network location information, etc.

Figure 5:
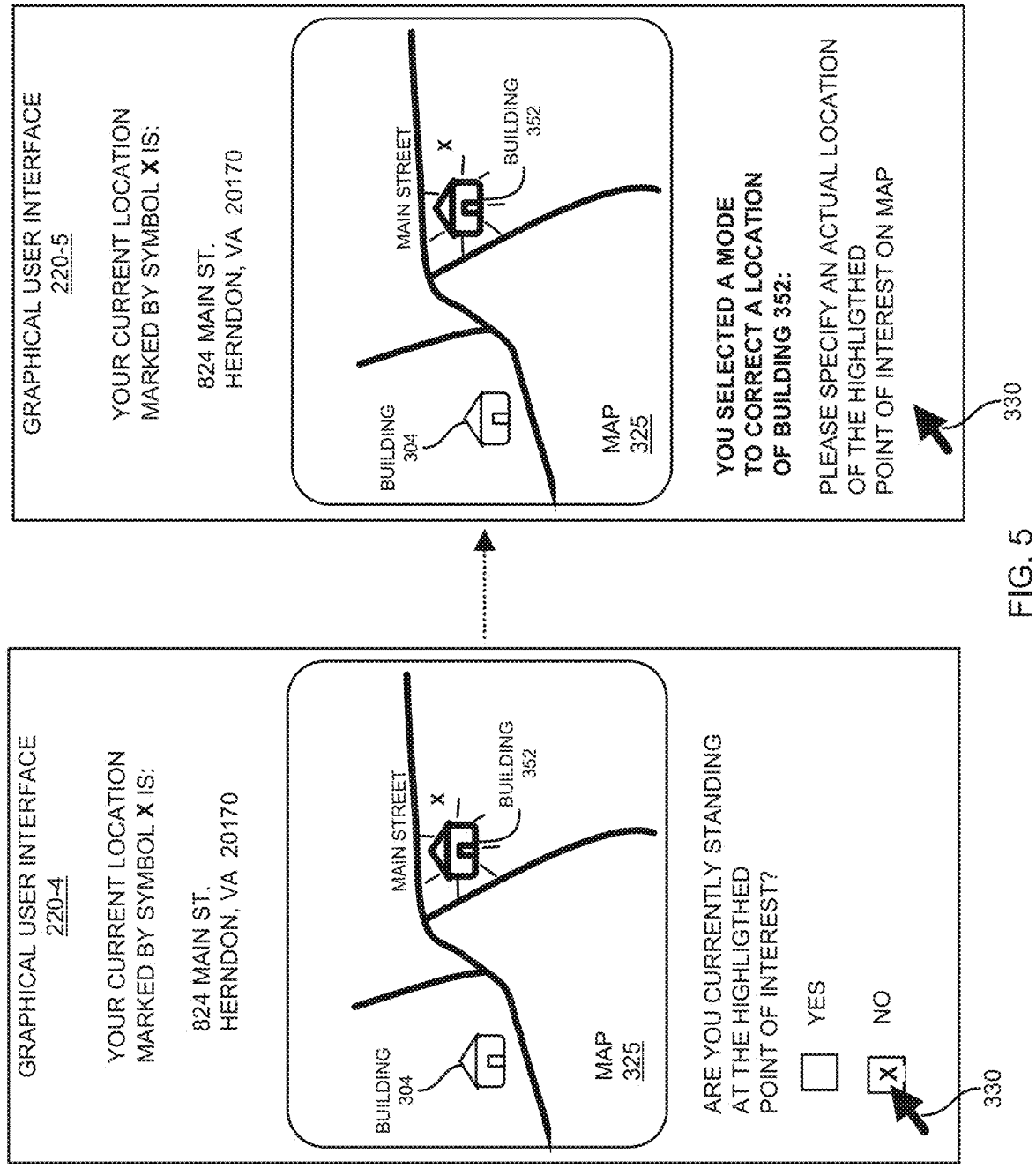
FIG. 5 is an example diagram illustrating a graphical user interface enabling a respective mobile device user to specify a location of a point of interest on a map according to embodiments herein.

FIG. 5 is an example diagram illustrating a graphical user interface enabling a respective user to specify a correct location of a point of interest on a map according to embodiments herein.

As previously discussed, assume that the user selects building symbol 352 as being incorrectly placed on map 325. In this example embodiment, the X marking on map 325 of graphical user interface 220-3 indicates that the user 108-1 should be standing next to physical building 352. However, assume that the user 108-1 physically looks around and learns that the actual location of physical building 352 is at different coordinates than as specified by building symbol 352 on map 325. In this instance, in response to selection of the NO box in graphical user interface 220-3, the map management application 240 learns from the user 108-1 that actual location of the physical building 352 is at a location other than at the location indicated by map 325, and that the user 108-1 is not located directly at the building 352.

In this example embodiment, in response to receiving selection of the NO box, the map management application 240 initiates display of another prompt requesting that the user 108-1 specify an actual location on displayed map 325 where the physical building 352 is located. For example, after selecting the NO checkbox in graphical user interface 220-4, the graphical user interface 220-5 displays the text "Please specify an actual location of the highlighted point of interest on map."

Figure 6:
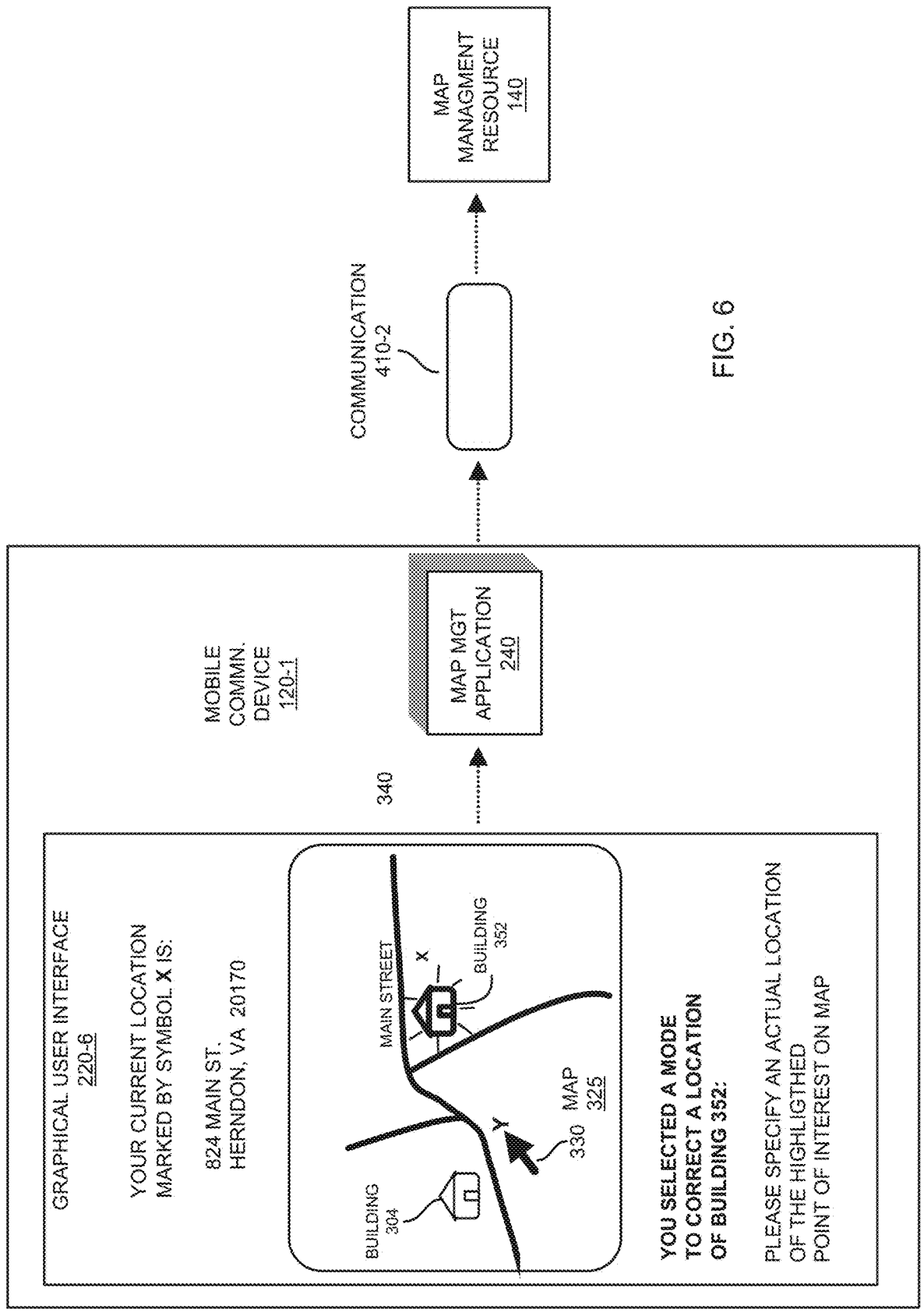
FIG. 6 is an example diagram illustrating generation and forwarding of a communication from a mobile communication device to update geographical information according to embodiments herein.

FIG. 6 is an example diagram illustrating generation and forwarding of a communication from a mobile communication device to update geographical information according to embodiments herein.

As shown in graphical user interface 220-6, assume that user 108-1 operates selection resource 330 to select the coordinates (such as a set of X-Y coordinates) as specified by the letter Y in map 325. Note that the coordinates as specified by the letter Y is different than a current location of the mobile communication device 120-1 as indicated by the coordinates of letter X. Thus, the user 108-1 provides direct input to the map 325 displayed on the display screen 130 of the mobile communication device 120-1 to indicate the actual location of the point of interest is at a remote location with respect to the user 108-1 (and mobile communication device 120-1).

The map management application 240 of mobile communication device 120-1 receives selection of the set of coordinates associated with the coordinates of letter Y displayed on the map 325.

In response to receiving the input command such as selection of the coordinates marked with the letter Y on graphical user interface 220-4, the map management application 240 of mobile communication device 120-1 generates communication 410-2 to include data such as an identity of the selected point of interest (building 352), proposed coordinates as specified by the letter Y (such as a selected set of coordinates) where the point of interest is actually located, and a current location (such as set of coordinates specifying location X) of the mobile communication device 120-1 in a respective geographical region.

Subsequent to generating communication 410-2, the map management application 240 initiates transmission of the communication 410-2 over wireless communication link 128-1 of network 190 to the map management resource 140 to update the map information 170. In one embodiment, the message is specifically encoded to indicate that the user 108-1 selected the NO box, notifying the map management resource 140 that the user 108-1 purports that the actual location of the physical building 352 is at the selected coordinates Y as opposed to being located at the coordinates X as specified in map 325. In accordance with further embodiments, the communication of 410-1 additionally can include an identity of the user 108-1 to indicate the entity generating the geodata correction message.

The map management resource 140 receives the communication 410-2 from the mobile communication device 120-1 indicating that the selected point of interest (building 352) is located at the location as marked by the coordinates associated with the letter Y as opposed to being located near the coordinates as specified by the letter X.

Via communication 410-2, the map management resource 140 identifies that the user 108-1 believes that the physical building 352 is located in a different location than as specified by coordinates of building symbol 352 on map 325. If the map management resource 140 deems the user 108-1 to be sufficiently trustworthy, the map management resource 140 updates map information 170 to correct geodata specifying a location of building 352 to be in a vicinity of coordinates of letter Y on map 325 as opposed to being located in a vicinity of the coordinates marked with the letter X on map 325.

Note that updating of map information 170 can be further contingent upon a nearness of the current location (such as coordinates denoted by the letter X) of the mobile communication device to the proposed location (such as coordinates denoted by the letter Y) in order to determine whether the proposed coordinates Y are credible. For example, the map management resource 140 can be configured to compare a closeness of the mobile communication device 120-1 (as specified by a set of coordinates indicating the location X) to the proposed coordinates (as specified by letter Y) by user 108-1 in order to determine a degree of reliability that the point of interest (physical building 352) is actually located at the proposed coordinates (letter Y). As previously mentioned, the nearer the mobile communication device 120-1 is to the proposed coordinates as specified by letter Y, the more likely it is that the feedback from user 108-1 indicating the actual location of the point of interest is correct.

As a more specific example, if the coordinates as marked by the letter Y is determined to be a physical location that is less than 200 yards from the pjys location marked by the coordinates associated with letter X as detected by map management resource 140, then the map management resource 140 deems the inputted communication 410-2 to be highly credible. In such an instance, the map management resource 140 may proceeds with updating respective geodata associated with the building symbol 352.

In one embodiment, after determining that the input from user 108-1 is trustworthy above a threshold value, in accordance with the communication 410-2 received from the mobile device user, the map management resource 140 updates corresponding map data 170 to specify that an actual location of the point of interest (physical building 352) is at the proposed coordinates as specified by letter Y as opposed to the coordinates marked by letter X on map 325.

On the other hand, if the map management resource 140 detects that the location as marked by coordinates of letter Y is greater than a threshold value such as 200 yards from the location marked by coordinates of letter X, then the inputted communication 410-2 may be deemed incredible (not believable). In this latter instance, the map management resource 140 prevents updating respective geodata associated with the building symbol 352 based on the input from user 108-1.

Figure 7:
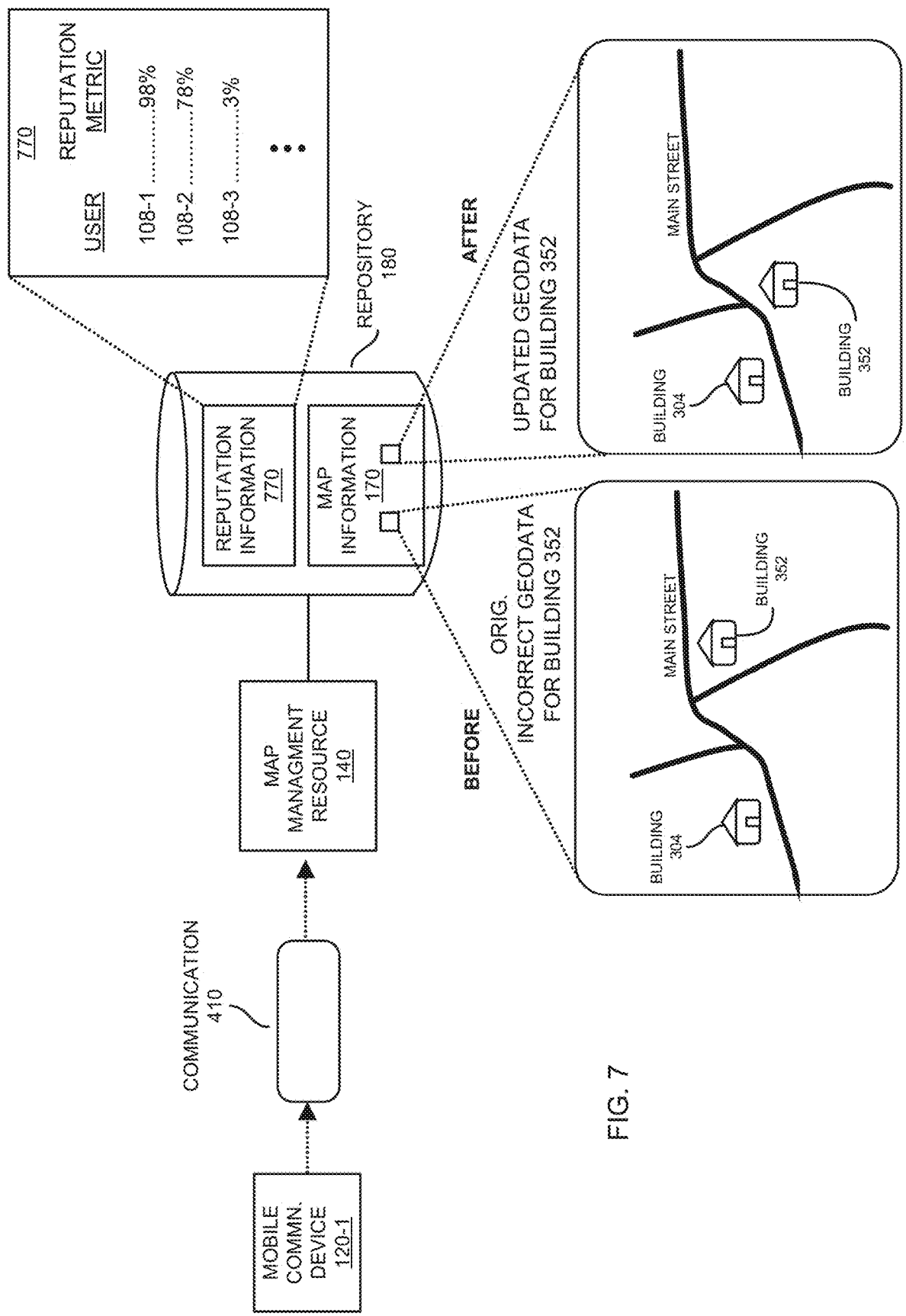
FIG. 7 is an example diagram illustrating updating of geographical information depending on a reputation of a corresponding mobile device user according to embodiments herein.

FIG. 7 is an example diagram illustrating updating of geographical information based on a reputation of a corresponding mobile device user according to embodiments herein.

In accordance with further embodiments, as previously discussed, prior to updating map information 170 correcting geodata associated with a respective location of the point of interest such as building symbol 352, the map management resource 140 can be configured to verify credibility of the mobile device user submitting a correction to corresponding geodata. For example, in one embodiment, the map management resource 140 processes the received communications 410 (such as communication 410-1 or communication 410-2) to identify an identity of the user 108-1 transmitting the respective map update requests.

In this example embodiment, assume that the map management resource 140 utilizes reputation information 770 to map the identity of the user 108-1 to a corresponding reputation metric (such as the value 98%, indicating that the user 108-1 has been 98% accurate with respect to prior proposed geodata corrections) assigned to the user 108-1.

In one embodiment, to determine whether or not to go forward with a proposed geodata update, the map management resource 140 compares the reputation metric for user 108-1 to a respective threshold value such as 85%. In response to detecting that the corresponding reputation metric of 98% is above the threshold value of 85% (indicating that the user 108-1 is usually correct in physical building 352 is actually located at location Y), the map management resource 140 updates the map data for the building symbol 352 to specify that an actual location of the point of interest is specified by coordinates of the location Y instead of the original location as specified by coordinates of building 352.

In one embodiment, the map management resource 140 produces the corresponding reputation metric for each user based on prior instances of the mobile device user providing proper location corrections for other points of interest.

Further in this example embodiment, note that if user 108-2 or user 108-3 inputted a request to update geodata associated with the building symbol 352 to a location as specified by the coordinates of letter Y, the map management resource 140 would prevent updating corresponding geodata associated with building symbol 352 because the corresponding reputation metrics assigned to each of users 108-2 and 108-3 is below the threshold value of 85%.

In accordance with further embodiments, the map management resource 140 can be configured to initiate updating location information associated with the point of interest only if a sufficient number of mobile communication device users above a threshold value indicate that the point of interest (such as building 352) is actually located at the coordinates marked with a letter Y. As an example, the map management resource 140 may require that at least 5 out of 6 users providing feedback each indicate that that the physical building 352 is located in a vicinity of a location as specified by the coordinates of letter Y. Thus, in such an embodiment, a single errant feedback from a given user will not cause the map management resource 140 to be updated to an incorrect new location.

Subsequent to updating the location information associated with the point of interest, the map management resource 140 and/or each of the mobile communication devices viewing map 325 can be configured to update the map 325 displayed on the display screen of a respective mobile communication device to indicate that the point of interest is located at the location as specified by the coordinates of letter Y as opposed to a location as specified by original incorrect coordinates of building symbol 352 in the map 325.

In accordance with another embodiment, note that user 108-1 can be an employee of a GIS-maintaining company and is in the field and searching for a particular item such as a fiber splice handhole. Assume that the user 108-1 does not find the fiber splice handhole where the GIS records indicate and engages in an expanding radius search using visual inspection, metal detectors, underground utility locators, and other information and tools that may be at his disposal to find the handhole in question. When the user 108-1 finds the handhole (perhaps several feet or tens of meters away), with his handheld device still in search mode, he stands astride it and engages the respective graphical user interface of his mobile communication device 120-1 which says "Found the point of interest; it is located here". In a similar manner as previously discussed, this information is communicated back to the map management resource 140 (such as a central GIS server) via realtime or non-realtime means. In this example, since the employee is presumably trustworthy or at least non-malicious, the map management resource 140 updates the GIS database. In one embodiment, the map management resource 140 saves historical information regarding the update for future reference.

In another embodiment, the GIS user is not an employee of the GIS maintaining company but rather a member of the general public in the field and searching for an establishment of broad public interest. He does not find the point of interest where the map information 170 indicates that it is located. Upon further investigation it turns out that the point of interest (coffee shop) has moved down the block and around the corner. The GIS user walks to the coffee shop and while standing on the doorstep f the point of interest engages the user interface element which says "Found it; it is here". This information is communicated back to the central GIS server via realtime or non-realtime means. Since the reporter is a random man-on-the-street with no particular loyalty to the organization collecting the data, it does not make sense to make a change based solely on that one individual's input.

In accordance with further embodiments, communications to the map management resource 140 can include additional trustworthiness information such as how many sources of location data were used to determine the present location of the mobile communication device 120-1 (such as count and geometry of GPS/GLONASS/Galileo/Compass satellites in play for the position solution, resolution/generation of the GPS receiver, timestamp, whether WiFi/mobile tower triangulation was used to supplement satellite data, etc.) rather than simply relying on a reputation metric associated with user 108-1 to determine his trustworthiness.

Figure 11:
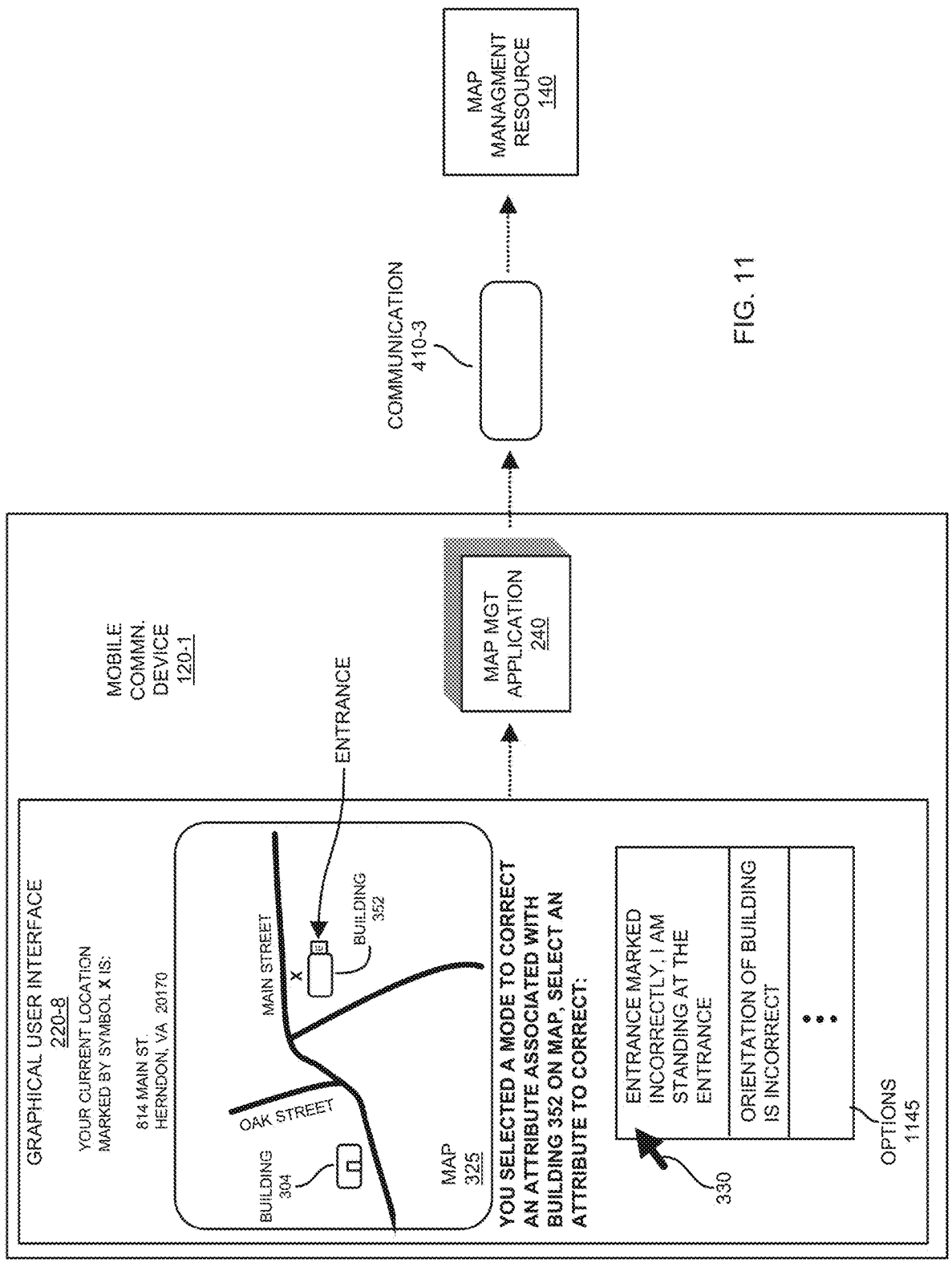
FIG. 11 is example diagram illustrating another example of updating geodata according to embodiments herein.

FIG. 11 is an example diagram illustrating another example of updating geodata according to embodiments herein.

In this example, assume that the coordinates marked by letter E of building symbol 352 on map 325 specify a corresponding entrance of physical building 352. From the perspective of user 108-1, assume that the coordinates of building symbol 352 on map are correct. However, assume that the user 108-1 detects that the entrance of building 352 is at the their current location (as marked by coordinates of letter X on map 325) as opposed to being located at coordinates marked by the letter E (specifying an entrance of building 352).

Further in this example embodiment, the user selects building symbol 352 via selection resource 352. Assume that the user 108-1 selects a correction mode and/or one or more options to correct an attribute associated with building symbol 352 because the entrance E as marked on building symbol 352 is incorrect. In response to selection of building symbol 352 and a correction mode to correct an attribute associated with building symbol 352, the map management application 240 initiates display of options 1145.

In this embodiment, the user 108-1 selects from displayed options 1145 (such as pull-down menu or other suitable resource) to specify a type of error (such as entrance is incorrectly marked, orientation of building is incorrect, etc.) associated with geodata.

In this example embodiment, assume that the user 108-1 uses selection resource 330 to select the first entry ("entrance marked incorrectly") in options 1145 as shown. In such an instance, the map management application 240 generates communication 410-3 to map management resource 140 to indicate that the user 108-1 (at the location marked by coordinates of letter X) is the actual entrance of the building as opposed to the location as specified by coordinates marked by the letter E. In response to receiving the communication 410-3, the map management resource 140 updates map information 170 to indicate that the entrance, E, is located at a respective facing of building 352 as specified coordinates of the letter X instead of the original incorrectly marked coordinates.

In accordance with another example embodiment, assume that the orientation of the building symbol 352 is incorrect and that the entrance of the building happens to be incorrect. In such an instance, the user 108-1 selects the appropriate option ("Orientation of Building is Incorrect") from options 1145. In response to receiving such input, the map management application 240 can be configured to further prompt the user 108-1 to provide further input such as a number of degrees, N, that the building symbol must be rotated clockwise to correct the orientation.

In this manner, a respective user 108-1 can select a resource in map 325 and easily provide input (such as selection of one or more displayed options) to indicate how to correct respective geodata without the need for the user 108-1 to input a long, free form text message.

Accordingly, the mobile communication device 120-1 can be configured to initiate display of a point of interest (such as building 352) as being located at particular coordinates on map 325 displayed on a respective display screen of mobile communication device 120-1. The map management application 240-1 receives selection, from user 108-1, of a symbol (building symbol 352) representing the point of interest. The map management application 240 initiates display of multiple options 1145 on the respective display screen for viewing by user 108-1. The multiple options 1145 specify different types of possible errors with respect to the building symbol 352 that can be corrected. The map management application 240 receives further input from the user 108-1 selecting one of the multiple options 1145. The selected option specifies an attribute (such as location of entrance) of the building symbol 352 that is incorrect. The map management application 240 forwards the selected option (entrance marked incorrectly) and identity of the selected symbol to map management resource 140. In accordance with further embodiments as previously discussed, the map management application 240 also can be configured to forward an identity of the user 108-1 to the map management resource 140. Map management resource 140 can be configured to verify the trustworthiness of user 108-1 prior to updating respective map information 170.

As previously discussed, embodiments herein are useful over conventional techniques because map management resource 140 is able to more easily identify and implement geodata updates that are to be made to map information 170 because the map management application 240 guides a respective user (via one or more graphical user interfaces, menus, selectable options, etc.) to provide the appropriate machine parsable input data to perform the respective geodata updates. For example, part of the problem associated with conventional techniques is that they rely on use of existing free-form text and human review to specify geodata updates. In contrast, embodiments herein include providing feedback such as machine location data, and potentially additional information such as machine-readable bits of metadata (such as "entrance" or "front of building", or similar data, as previously discussed) to provide notification of the geodata updates.

Figure 8:
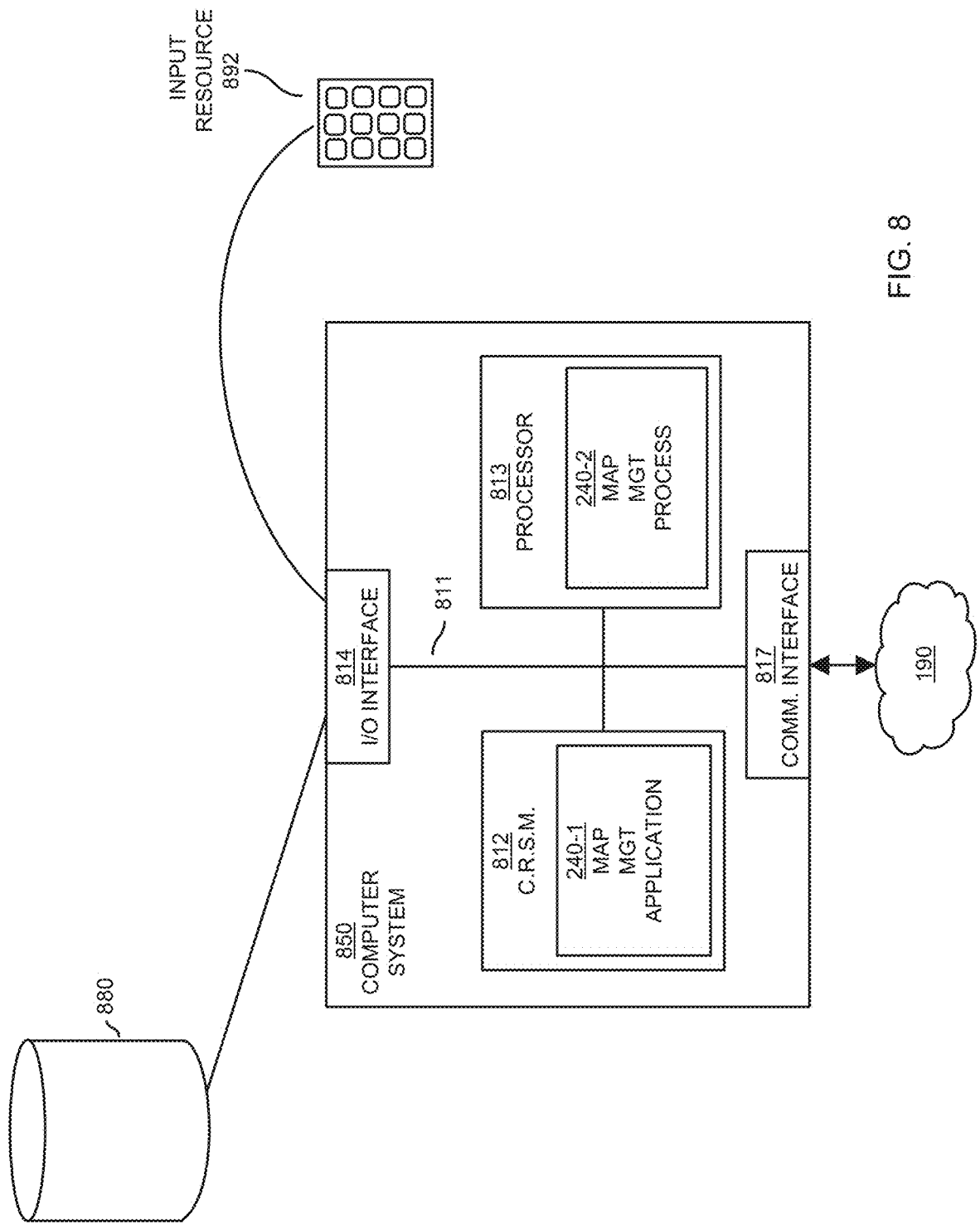
FIG. 8 is an example diagram illustrating a computer system to carry out operations according to embodiments herein.

FIG. 8 is a diagram illustrating an example computer architecture in which to execute any of the functionality according to embodiments herein. Any of the different processing techniques can be implemented via execution of software code on computer processor hardware.

For example, as shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 (such as a mobile communication device) can further include processor 813 (computer processor hardware such as one or more processors co-located or disparately located processor devices), I/O interface 814, communications interface 817, etc.

Note that computer processor hardware (i.e., processor 813) can be located in a single location or can be distributed amongst multiple locations.

As its name suggests, I/O interface 814 provides connectivity to resources such as repository 880, control devices (such as input resource 892), one or more display screens, etc.

Computer readable storage medium 812 can be any hardware storage device to store data such as memory, optical storage, hard drive, floppy disk, etc. In one embodiment, the computer readable storage medium 812 stores instructions and/or data.

Communications interface 817 enables the computer system 850 and processor resource 813 to communicate over a resource such as any of networks 190. I/O interface 814 enables processor resource 813 to access data from a local or remote location, control a respective display screen, receive input, etc.

As shown, computer readable storage media 812 can be encoded with map management application 240-1 (e.g., software, firmware, etc.) executed by processor 813. Map management application 240-1 can be configured to include instructions to implement any of the operations as discussed herein associated with a respective mobile communication device.

During operation of one embodiment, processor 813 accesses computer readable storage media 812 via the use of interconnect 811 in order to launch, run, execute, interpret or otherwise perform the instructions in map management application 240-1 stored on computer readable storage medium 812.

Execution of the map management application 240-1 produces processing functionality such as network management process 240-2 in processor resource 813. In other words, the network management process 240-2 associated with processor resource 813 represents one or more aspects of executing map management application 240-1 within or upon the processor resource 813 in the computer system 850.

Those skilled in the art will understand that the computer system 850 can include other processes and/or software and hardware components, such as an operating system that controls allocation and use of hardware resources to execute map management application 240-1.

In accordance with different embodiments, note that computer system 850 may be any of various types of devices, including, but not limited to, a mobile communication device, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource (e.g., mobile communication device 120-1, mobile communication device 120-2, etc.) in network environment 100 to implement functionality as discussed herein.

Note that each of the other functions as discussed herein can be executed in a respective computer system based on execution of corresponding instructions. For example, map management resource 140 can be configured to include a respective computer readable storage medium and respective processor hardware to execute any of the operations performed by map management resource 140.

Functionality supported by the different resources will now be discussed via flowcharts in FIGS. 9 and 10. Note that the steps in the flowcharts below can be executed in any suitable order.

Figure 9:
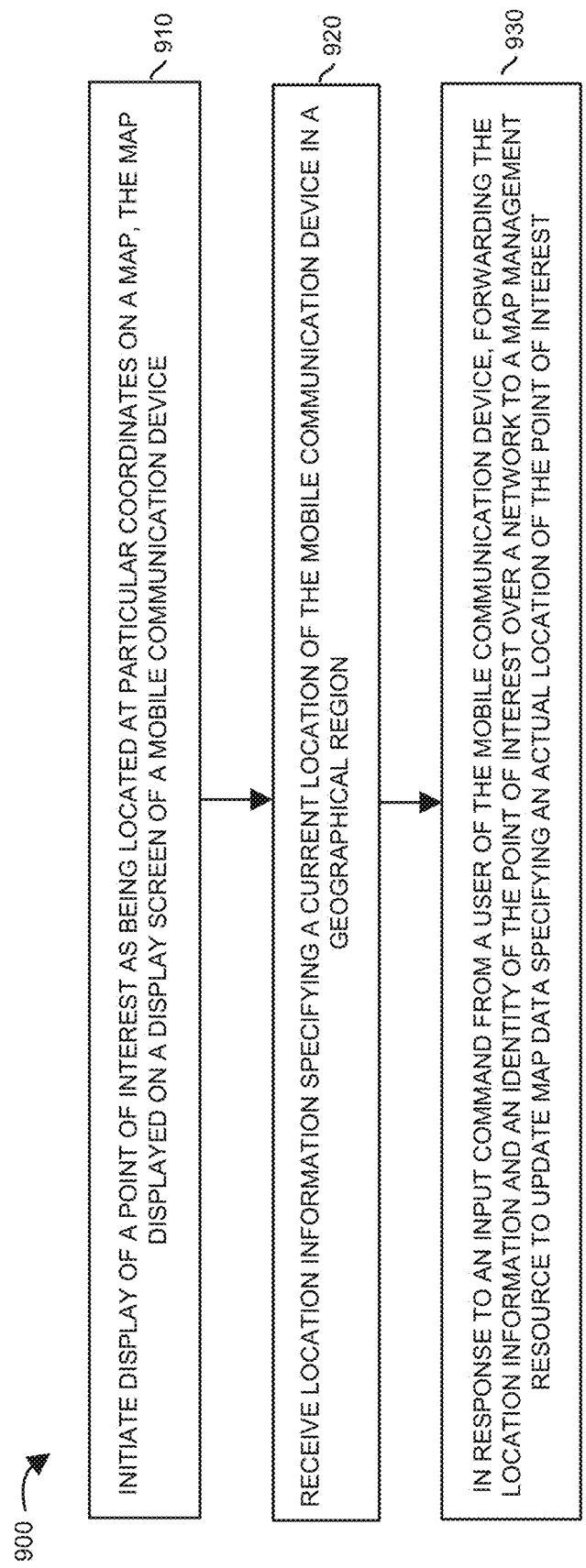
FIG. 9 is an example diagram illustrating a method of providing notification of incorrect geographical data according to embodiments herein.

FIG. 9 is a flowchart 900 illustrating an example method according to embodiments. Note that there will be some overlap with respect to concepts as discussed above.

In processing block 910, the map management application 240 in mobile communication device 120-1 initiates display of a point of interest as being located at particular coordinates on map 325. The map management application 240 of mobile communication device 120-1 displays the map 325 on a respective display screen 130.

In processing block 920, the map management application 240 of mobile communication device 120-1 receives location information specifying a current location of the mobile communication device in a geographical region.

In processing block 930, in response to an input command from a user 108-1 of the mobile communication device 120-1, the mobile communication device 120-1 forwards the location information and an identity of the point of interest over a network to a map management resource 140 to update map data (such as map information 170) specifying an actual location of the point of interest in a geographical region.

Figure 10:
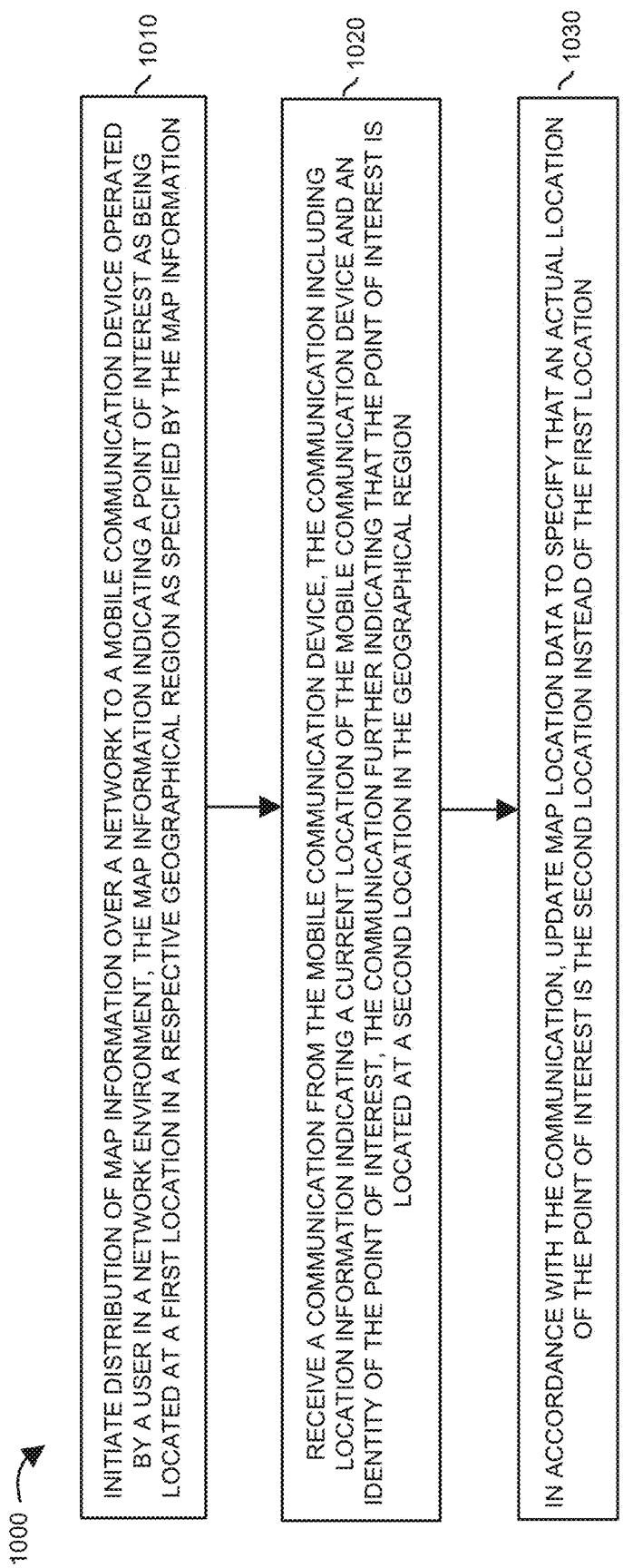
FIG. 10 is an example diagram illustrating a method of managing geographical information and geodata updates according to embodiments herein.

FIG. 10 is a flowchart 1000 illustrating an example method according to embodiments. Note that there will be some overlap with respect to concepts as discussed above.

In processing block 1010, the map management resource 140 initiates distribution of map information 170 over a network 190 to a mobile communication device 120-1 operated by a user 108-1 in network environment 100. The map information 170 indicates a point of interest as being located at a first location in a respective geographical region as specified by the map information 170.

In processing block 1020, the map management resource 140 receives a communication from the mobile communication device 120-1. The received communication includes location information indicating a current location of the mobile communication device 120-1 and an identity of the point of interest. The communication further indicates that the point of interest is located at a second location in the geographical region as opposed to the first location.

In processing block 1030, in accordance with the communication, the map management resource 140 updates the map data (such as map information 170) to specify that an actual location of the point of interest is the second location instead of the first location.

Note again that techniques herein are well suited for managing and correcting geographical data. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   storing map information indicating a location of a building in a geographical region;
   communicating the map information to a mobile communication device to display a building symbol representing the building in the geographical location, the displayed building symbol indicating particular coordinates of the building on a map displayed on a display screen of the mobile communication device;
   receiving input from the user indicating an attribute of the displayed building symbol that is incorrect; and
   via the input, updating the map information, the updated map information correcting the attribute of the building symbol representative of the building.

2. The method as in claim 1, wherein the attribute of the building symbol being corrected is an orientation of the building at the particular coordinates to the map.

3. The method as in claim 1, wherein the attribute of the building symbol being corrected is a location representing an entrance of the building.

4. The method as in claim 1, wherein the attribute of the building symbol being corrected represents a facing of the building.

5. The method as in claim 1 further comprising:
   receiving input indicating a location of the mobile communication device; and
   selectively updating the map information based on a detected nearness of the location of the mobile communication device to the building represented by the building symbol.

6. The method as in claim 1,
   wherein the attribute of the building symbol represents a location of a component of the building.

7. The method as in claim 1 further comprising:
   receiving input from the user selecting a type of attribute from a list, the selected type of attribute indicating a portion of the building symbol that is incorrect.

8. The method as in claim 1, wherein the building symbol is a first symbol, the method further comprising:
   initiating display of a second symbol on the map displayed on the mobile communication device, the second symbol indicating a current location of the mobile communication device with respect to the first symbol.

9. The method as in claim 1 further comprising:
   utilizing the input from the user to modify an appearance of the building symbol representing the building.

10. The method as in claim 1 further comprising:
    processing the input to identify an identity of the user;
    mapping the identity of the user to a corresponding reputation metric assigned to the user; and updating the map information and the building symbol in response to detecting that the corresponding reputation metric is above a threshold value.

11. The method as in claim 1 further comprising:
processing the input to detect an identity of a user operating the mobile communication device;
mapping the detected identity of the user to a corresponding reputation metric assigned to the user, a magnitude of the corresponding reputation metric being based on prior instances of the user providing correction information; and
updating the map information based at least in part in response to detecting that the corresponding reputation metric is reliable above a threshold value.

12. The method as in claim 1, wherein the particular coordinates indicate a correct location of the building on the map displayed on the display screen.

13. The method as in claim 1, wherein the input indicates a location of a user operating the mobile communication device.

14. The method as in claim 13, wherein the incorrect attribute of the building symbol is a component of the building; and
wherein the location of the user operating the mobile communication device indicates that the user operating the mobile communication device is located at the component of the building.

15. The method as in claim 1, wherein the attribute of the building symbol being corrected via the input is a portion of the building symbol.

16. The method as in claim 15, wherein the portion of the building symbol incorrectly indicates a location of a component of the building, the input from the user indicating a correct location of the component of the building.

17. The method as in claim 1, wherein the attribute specified by the input is a visual marking on the building symbol.

18. The method as in claim 17, wherein the visual marking on the building symbol describes a portion of the building.

19. The method as in claim 17, wherein the input indicates a correct location of a portion of the building represented by the visual marking.

20. The method as in claim 1, wherein receiving input from the user includes receiving selection of the building symbol displayed on the display screen; and
wherein the selection of the building symbol indicates an error associated with the building symbol.

21. The method as in claim 1, wherein the input indicates how to correct the building symbol.

22. A system comprising:
a repository to store map information indicating a location of a point of interest in a geographical region;
map management hardware operable to:
communicate the map information to a mobile communication device to display a symbol representing the point of interest, the displayed symbol indicating particular coordinates of the point of interest on a map displayed on a display screen of the mobile communication device;
receive input from the user indicating a portion of the displayed symbol that is incorrectly marked; and
utilize the input to update the map information to correct the portion of the symbol that is incorrectly marked.

23. The system as in claim 22, wherein the point of interest represented by the symbol is a building in the geographical region.

24. The system as in claim 23, wherein the portion of the displayed symbol being corrected represents an orientation of the building.

25. The system as in claim 23, wherein the portion of the displayed symbol being corrected is a location representing an entrance of the building.

26. The system as in claim 23, wherein the portion of the displayed symbol being corrected represents a facing of the building.

27. The system as in claim 22, wherein the map manager hardware is further operable to:
receive input indicating a location of the mobile communication device; and
selectively update the map information based on a detected nearness of the mobile communication device to the point of interest.

28. The system as in claim 22, wherein the point of interest is a physical structure in the geographical region; and
wherein the portion of the displayed symbol represents a location of a component with respect to the physical structure.

29. The system as in claim 22, wherein the map management hardware is further operable to:
receive input from the user selecting a type of attribute, the selected type of attribute indicating a component of the displayed symbol that is incorrect.

30. The system as in claim 22, wherein the symbol is a first symbol, the map management hardware further operable to:
initiate display of a second symbol on the map displayed on the mobile communication device, the second symbol indicating a current location of the mobile communication device with respect to the first symbol.

31. The system as in claim 22, wherein the map management hardware is further operable to:
utilize the input from the user to modify the symbol representing the point of interest.

32. The system as in claim 22, wherein the map management hardware is further operable to:
process the input to identify an identity of the user;
map the identity of the user to a corresponding reputation metric assigned to the user; and
update the map information in response to detecting that the corresponding reputation metric is above a threshold value.

33. Computer-readable storage hardware having instructions stored thereon, the instructions, when carried out by computer processor hardware, causing the computer processor hardware to:
store map information indicating a location of a point of interest in a geographical region;
communicate the map information to a mobile communication device to display a symbol representing the point of interest, the displayed symbol indicating particular coordinates of the point of interest on a map displayed on a display screen of the mobile communication device;
receive input from the user indicating a portion of the displayed symbol that is incorrectly labeled; and
utilize the input to update the map information to correct the portion of the symbol that is incorrectly labeled.

34. A method comprising:
communicating map information to a mobile communication device to display a symbol representing the point of interest, the displayed symbol indicating particular coordinates of the point of interest on a map displayed on a display screen of the mobile communication device;
receiving input from the user correcting a location of the point of interest on the map;
mapping the identity of the user to a corresponding reputation metric assigned to the user; and
selectively using the input to update the map information for the point of interest depending on the corresponding reputation metric.

* * * * *

UNITED STATES PATENT AND TRADEMARK OFFICE
CERTIFICATE OF CORRECTION

PATENT NO. : 10,928,218 B2
APPLICATION NO. : 16/134011
DATED : February 23, 2021
INVENTOR(S) : Robert Seastrom, Wesley E. George and Chris R. Roosenraad Page 1 of 1

It is certified that error appears in the above-identified patent and that said Letters Patent is hereby corrected as shown below:

In the Claims

Column 22, Line 34, delete "to" and insert --on--

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*